United States Patent [19]

Greis

[11] Patent Number: 4,852,345
[45] Date of Patent: Aug. 1, 1989

[54] METHOD OF COOLING BED MATERIAL FROM A FLUIDIZED BED AND A POWER PLANT WITH COOLING MEANS FOR BED MATERIAL

[75] Inventor: Ingemar Greis, Västerås, Sweden
[73] Assignee: ABB Stal AB, Sweden
[21] Appl. No.: 157,012
[22] Filed: Feb. 18, 1988
[30] Foreign Application Priority Data
  Mar. 3, 1987 [SE] Sweden ............................... 8700877
[51] Int. Cl.⁴ ............................................... F02C 3/26
[52] U.S. Cl. .................................. 60/39.464; 110/266
[58] Field of Search ........................... 60/39.12, 39.464; 110/244, 245, 263, 266; 122/4 D; 431/170

[56] References Cited

U.S. PATENT DOCUMENTS 2,874,950  2/1959  Pyzel .
4,245,463  1/1981  Mansson et al. .................. 60/39.464
4,498,286  2/1985  Brannstrom et al. ............. 60/39.464
4,623,309  11/1986  Teigen .
4,640,205  2/1987  Brannstrom .

FOREIGN PATENT DOCUMENTS 63173  10/1982  European Pat. Off. .
2032598  5/1980  United Kingdom .

Primary Examiner—Louis J. Casaregola

[57] ABSTRACT

A power plant with combustion of a fuel at a pressure exceeding the atmospheric pressure in a fluidized bed (14) in a bed vessel (12) which is enclosed within a pressure vessel (11). The space (37) between the pressure vessel (11) and the bed vessel (12) is supplied with combustion air from a compressor (22). Ash and consumed bed material are taken out from the bed vessel (12) via an ash chamber (34) and are cooled therein by air from the space (37). The air from the space (37) is cooled in a cooler (44) before being supplied to the ash chamber (34).

5 Claims, 1 Drawing Sheet

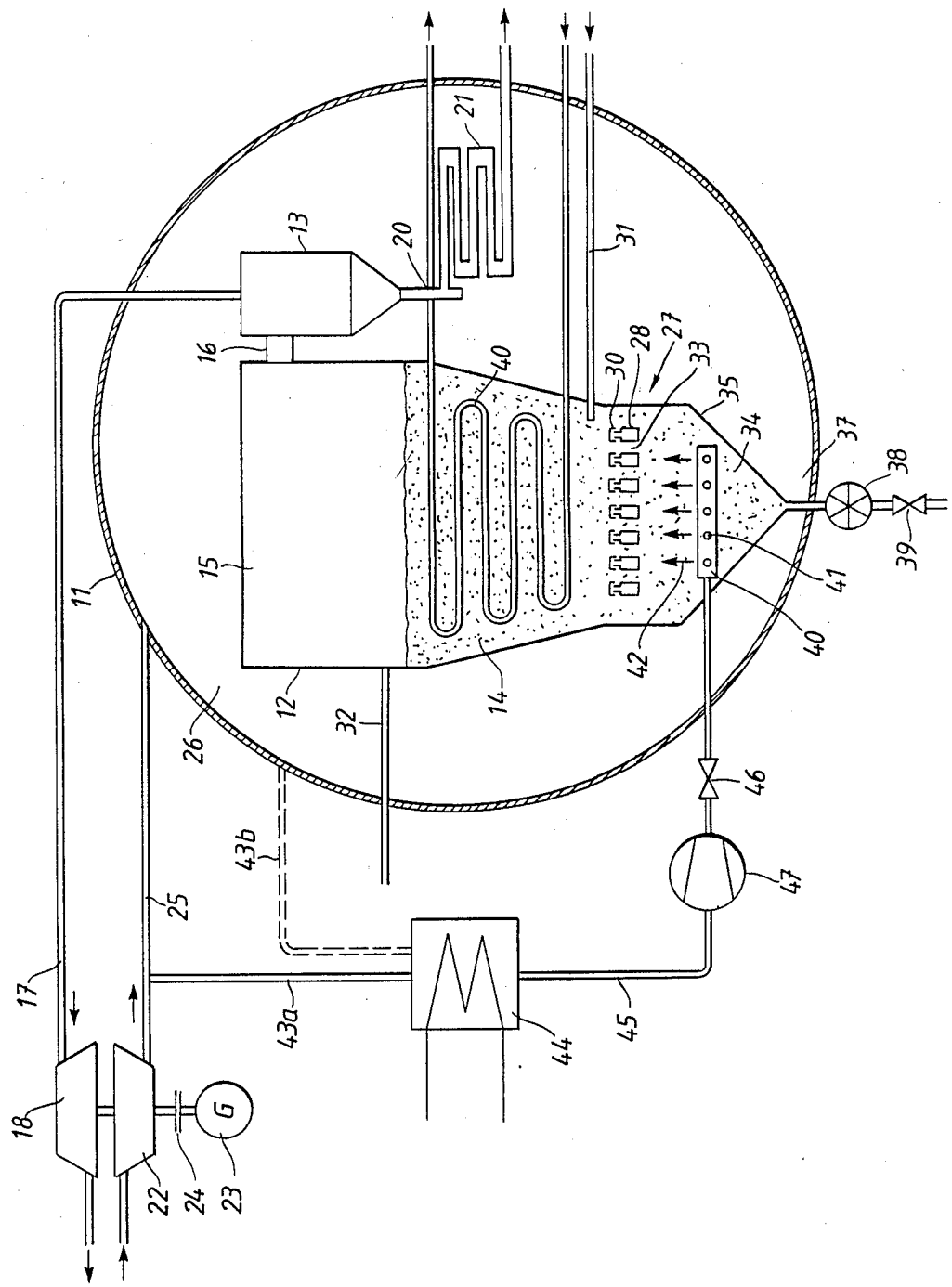

METHOD OF COOLING BED MATERIAL FROM A FLUIDIZED BED AND A POWER PLANT WITH COOLING MEANS FOR BED MATERIAL

TECHNICAL FIELD

The invention relates, on the one hand, to a method of cooling bed material when discharging bed material from a pressurized fluidized bed of particulate material in a bed vessel which is under pressure and, on the other hand, to a power plant with combustion of fuel in a pressurized fluidized bed and a cooling device for cooling bed material. It is primarily intended for a PFBC power plant in which a bed vessel is arranged in a pressure vessel and surrounded by compressed air. The word "PFBC" is formed of the initial letters in the English expression Pressurized Fluidized Bed Combustion.

BACKGROUND ART

Bed material, consumed absorbent and ashes formed by the fuel must be continuously fed out from a bed vessel with combustion in a fluidized bed for the bed level to be maintained at the desired level. In a power plant with combustion at a pressure exceeding the atmospheric pressure, there must be a gas-sealing sluice system in the discharge system; for a rotary sluice valve or a lock hopper system with series-connected valves and containers. The stress on the components included is great because the bed material has a high temperature and is greatly abrasive. To reduce the temperature stresses, it is known to provide, in an ash chamber below the fluidization nozzles of the combustion chamber, cooling tubes for cooling the bed material before it reaches the discharge device. In PFBC power plants with a bed vessel enclosed within a pressure vessel, it is known to cool bed material in the ash chamber by combustion air introduced into the ash chamber directly from the surrounding space in the pressure vessel. The cooling air is utilized for the combustion and the cooling device is simple. However, the possibility of cooling is limited to about 300° C. because the compresssed combustion air between the pressure vessel has a high temperature. During compression, the temperature rises and in the pressure vessel it is further heated by the bed vessel and the cleaning plant in the pressure vessel.

SUMMARY OF THE INVENTION

According to the invention, part of the air which is compressed for the fluidization and the combustion is utilized for cooling of bed material to be removed from the bed vessel. This cooling air is tapped off either directly from the compressor which compresses the combustion air, from a conduit for the compressed air between the compressor and the bed vessel, or from a pressure vessel which surrounds the bed vessel. The tapped-off air is cooled by a cooler to a low temperature, suitably to a temperature below 100° C. and is supplied to an air distributor, arranged in the ash chamber, with a number of air openings or nozzles. A booster compressor may be provided in the cooling air conduit.

For the ash to be cooled to approximately the same temperature as the incoming cooling air, the flowing conditions must be fulfilled:

(a) The heat capacity of the flow of cooling air must be greater than the heat capacity of the flow of bed material. The following conditions must apply $$\frac{\dot{m}_A \cdot C_{PA}}{\dot{m}_B \cdot C_{PB}} > 1$$

where
$\dot{m}_A$ = mass flow air
$C_{PA}$ = specific heat capacity of the air
$\dot{m}_B$ = mass flow bed material
$C_{PB}$ = specific heat capacity of the bed material (b) A solid, i.e. non-fluidized zone of bed material must be provided between cooling air nozzles and fluidization nozzles.

If the above-mentioned conditions are satisfied, the temperature of the downwardly-moving bed material rapidly drops to the temperature of the upwardly-moving cooling air. The area of the particles in the bed material is large, usually larger than 3000 m² per m³ of bed material, which causes the material to be rapidly cooled.

To reduce the risk of slag formation in the boundary zone between solid and fluidized beds, the following condition should be fulfilled:

$$\frac{\dot{m}_A \cdot C_{PA}}{\dot{m}_B \cdot C_{PB}} > 1.5$$

ADVANTAGES

The ash is cooled by air in the ash chamber to a lower temperature than what has been possible with prior art embodiments of plants of the kind in question. The need for a separate cooler outside of the bed vessel is eliminated. The temperature stresses on the discharge device are reduced. Heat which is cooled away from the bed material is utilized completely for heating combustion air and is recovered.

BRIEF DESCRIPTION OF THE DRAWING

The invention will be described in greater detail with reference to the accompanying drawing, the single FIGURE of which shows a PFBC power plant with a bed vessel enclosed within a pressure vessel.

DESCRIPTION OF THE PREFERRED EMBODIMENT

In the FIGURE, 11 designates a pressure vessel, 12 bed vessel and 13 a cleaner of cyclone type enclosed within the pressure vessel 11. Only one cyclone 13 is shown, but in reality a cleaning plant with a plurality of parallel groups of series-connected cyclones 13 is provided. Fuel is burnt in a fluidized bed 14 in the bed vessel 12. The bed 14 consists of particulate sulphur absorbing material, such as limestone or dolomite. The main part of this material usually has a grain size of between 0.5 and 5.0. Combustion gases formed are accumulated in the freeboard 15 and flow through the conduit 16 to the cleaner 13, where dust is separated, and from the cleaner 13 through the conduit 17 to the turbine 18 and from there, for example, to a waste heat boiler (not shown). Separated dust is fed out from the cyclone 13 through the conduit 20 and the pressure-reducing discharge device and the cooler 21 to a receiving container (not shown). The turbine 18 drives a compressor 22 and, through a coupling 24, a generator 23 which feeds out energy onto an electricity supply network. The generator 23 can also be utilized as a starter motor.

The space 26 between the pressure vessel 11 and the bed vessel 12 and the cleaners 13 is supplied with compressed air through the conduit 25. The pressure may amount to 2 MPa or more. The bed vessel 12 is provided with a bottom 27 consisting of elongated air distribution chambers 28 with air nozzles 30. Through the air nozzles 30 the bed 14 is supplied with air for fluidization and for combustion of supplied fuel. Fuel is supplied to the bed 14 through a conduit 31 from a fuel storage (not shown). Fuel nozzles (not shown) are evenly distributed in the bed vessel 12, suitably one nozzle per m² bottom area. Fresh bed material is supplied to the bed 14 through a conduit 32 from a bed material storage (not shown). Between the air distribution chambers 28 there are gaps 33 through which bed material from the bed 14 may fall down into the ash chamber 34 in the discharge cone 35 in the lower part of the bed vessel 12. From the ash chamber 34 bed material is fed out through a discharge conduit and the discharge sluice 38. The ash chamber 34 accomodates a distributor 40 with nozzles or openings 41 for injection of cooling air for cooling the bed material present in the ash chamber 34. The cooling air flows upwards through the bed material, as shown by the arrows 42, cools the bed material on its way upwards and is utilized for combustion when it has passed through the bottom 27. Cooling air with a somewhat higher temperature than the temperature in the ash chamber 34 can be taken out from the conduit 25 between the compressor 22 and the pressure vessel 11 or from the space 26 in the pressure vessel 11. The air is passed through the conduits 43a and 43b, respectively (43b being shown dash-lined), to the cooler 44 where it is cooled to a low temperature. From the cooler 44 the air is passed on to the air distributor 40 through the conduit 45. The conduit 45 includes a control valve 46 for controlling the cooling air flow. If there is a need to raise the pressure of the cooing air, also a booster compressor 47 may be provided in the conduit 45.

I claim:

1. A power plant for combustion of a fuel in a fluidized bed at an elevated pressure substantially higher than atmospheric pressure, comprising
   a bed vessel;
   a bottom in a lower part of said bed vessel including nozzles for supplying air for the fluidization of a bed material and combustion of a fuel;
   an ash chamber located below said bottom and means for feeding out bed material from said ash chamber;
   a turbine driven by combustion gases generated in said bed vessel;
   a compressor for compressing the combustion air supplied to said bed vessel;
   a cooling air distributor provided in said ash chamber for introducing air compressed by said compressor into ashes in said ash chamber for cooling said ashes; and
   an air cooler located upstream of said air cooling distributor for cooling said compressed air from said compressor before supplying said air to said ash chamber.

2. A power plant according to claim 1, wherein said air cooling distributor is connected to a conduit from said compressor through said air cooler.

3. A power plant according to claim 1, wherein said bed vessel is enclosed within a pressure vessel and wherein said air cooling distributor is connected to said pressure vessel through said air cooler.

4. A power plant according to claim 1, wherein the heat value ($m_A C_{PA}$) of the cooling air is greater than the heat value ($m_B C_{PB}$) of the discharged bed material.

5. A power plant according to claim 1, wherein a non-fluidized zone of bed material is located between said air distributor and the fluidization nozzles.

* * * * *